US012760176B2

(12) United States Patent
Kong et al.

(10) Patent No.: US 12,760,176 B2
(45) Date of Patent: Oct. 13, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Seonho Kong, Daejeon (KR); Gun Ko, Daejeon (KR); Sun Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 674 days.

(21) Appl. No.: 18/021,785

(22) PCT Filed: Aug. 12, 2022

(86) PCT No.: PCT/KR2022/012069
§ 371 (c)(1),
(2) Date: Feb. 16, 2023

(87) PCT Pub. No.: WO2023/033404
PCT Pub. Date: Mar. 9, 2023

(65) Prior Publication Data
US 2024/0240013 A1 Jul. 18, 2024

(30) Foreign Application Priority Data
Sep. 2, 2021 (KR) ........................ 10-2021-0116824

(51) Int. Cl.
*C08L 67/02* (2006.01)
*C08J 3/20* (2006.01)

(52) U.S. Cl.
CPC ............... *C08L 67/02* (2013.01); *C08J 3/203* (2013.01); *C08J 2367/02* (2013.01); *C08J 2425/12* (2013.01); *C08J 2451/00* (2013.01); *C08J 2467/02* (2013.01); *C08L 2205/025* (2013.01); *C08L 2205/035* (2013.01)

(58) Field of Classification Search
CPC ............... C08L 67/02; C08L 2205/025; C08L 2205/035; C08L 63/04; C08L 2205/02; C08L 25/12; C08J 3/203; C08J 2367/02; C08J 2425/12; C08J 2451/00; C08J 2467/02
See application file for complete search history.

(56) References Cited

U.S. PATENT DOCUMENTS 6,242,519 B1 * 6/2001 Cheret .................... C08L 67/02 524/451
2004/0254270 A1 12/2004 Harashina
2006/0079638 A1 * 4/2006 Matsushima ........... C08L 51/08 525/63
2006/0142438 A1 6/2006 Ishii et al.
2008/0076859 A1 3/2008 Eipper et al.
2011/0144239 A1 * 6/2011 Lee ......................... C08L 67/02 523/522
2014/0058015 A1 2/2014 Yamada et al.
2020/0079919 A1 * 3/2020 Tsuchigane ............. C03C 3/087

FOREIGN PATENT DOCUMENTS

CN 1757673 A 4/2006
CN 102093667 A 6/2011
CN 102093677 A 6/2011
CN 103443193 A 12/2013
EP 2692794 A1 2/2014
JP 2006104363 A 4/2006
JP 4220902 2/2009
JP 5217425 6/2013
JP 5710864 4/2015
JP 5875579 3/2016
JP 6177190 B2 * 8/2017 ............... C08K 7/02
KR 10-2001-0075526 8/2001
KR 10-2005-0092692 9/2005
KR 10-2011-0066598 6/2011
KR 20110066598 A 6/2011
KR 10-1192871 10/2012
KR 10-1201832 11/2012
(Continued)

OTHER PUBLICATIONS

English translation of JP-6177190-B2 (Year: 2017).*
(Continued)

*Primary Examiner* — Andrew J. Oyer
*Assistant Examiner* — Cullen L G Davidson
(74) *Attorney, Agent, or Firm* — Bryan Cave Leighton Paisner LLP

(57) ABSTRACT

Provided is a thermoplastic resin composition including 30 to 50 wt % of a polybutylene terephthalate resin (A); 8 to 20 wt % of a polyethylene terephthalate resin (B); 3 to 15 wt % of an acrylate-aromatic vinyl compound-vinyl cyanide compound graft copolymer (C); 3 to 15 wt % of an aromatic vinyl compound-vinyl cyanide compound copolymer (D); 25 to 40 wt % of glass fiber (E); 0.15 to 1 wt % of a carbodiimide-based compound (F); 0.5 to 1.5 wt % of an epoxy compound (G); and 0.25 to 1.2 wt % of a hindered amine-based light stabilizer (H), a method of preparing the thermoplastic resin composition, and a molded article including the composition.

The thermoplastic resin composition has excellent impact strength, tensile and flexural strength, and flexural modulus, and excellent heat resistance; has excellent flexural strength retention rate after the Air-HAST test; and satisfies product reliability required by automotive exterior materials and materials for electric/electronic parts.

12 Claims, No Drawings

(56) References Cited

FOREIGN PATENT DOCUMENTS

| | | |
|---|---|---|
| KR | 10-2014-0018292 | 2/2014 |
| KR | 20140018292 A | 2/2014 |
| KR | 10-2019-0027115 | 3/2019 |

OTHER PUBLICATIONS

International Search Report and the Written Opinion of PCT/KR2022/012069, mailed Nov. 18, 2022.
Extended European Search Report for EP Patent Application No. 22851001.2 dated Dec. 7, 2023.
Office Action of Korean Patent Office in Appl'n No. 10-2021-0116824, dated Apr. 7, 2025.

* cited by examiner

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application is a National Stage Application of International Application No. PCT/KR2022/012069 filed on Aug. 12, 2022, which claims priority to Korean Patent Application No. 10-2021-0116824, filed on Sep. 2, 2021, in the Korean Intellectual Property Office, the disclosure of which is incorporated herein by reference.

TECHNICAL FIELD

The present invention relates to a thermoplastic resin composition, a method of preparing the same, and a molded article including the same. More particularly, the present invention relates to a high-quality thermoplastic resin composition having excellent mechanical properties, heat resistance, and hydrolysis resistance and thus being applicable to automotive exterior materials and materials for electric/electronic parts, a method of preparing the thermoplastic resin composition, and a molded article including the thermoplastic resin composition.

BACKGROUND

Among engineering plastics, a polybutylene terephthalate (hereinafter referred to as "PBT") resin is a crystalline material and has a fast crystallization rate and an appropriate molding temperature range. In addition, the PBT resin has heat resistance, chemical resistance, electrical properties, mechanical strength, and molding processability superior to those of other materials. Due to these advantages, the PBT resin has been applied to various fields such as automobiles, electric/electronic devices, and office equipment.

Since automotive exterior materials are directly exposed to external environments, automotive exterior materials are required to have superior mechanical properties, heat resistance, weather resistance, and the like, compared to automotive interior materials. Thus, a material of PBT resin/acrylate-styrene-acrylonitrile resin/glass fiber has been used to manufacture automotive exterior materials. Since the weather resistance of the material is improved due to the acrylate-styrene-acrylonitrile resin, and the mechanical properties thereof is increased due to the glass fiber, the material is usefully used as an automotive exterior material.

However, PBT resins have low hydrolysis resistance, making it difficult to apply the PBT resins to various fields. In particular, in the case of materials for electric/electronic parts exposed to high-temperature and high-humidity environments, due to deterioration of mechanical properties due to hydrolysis, relatively weak fastening portions are prone to damage.

When a hydrolysis resistance increasing agent is added to increase the hydrolysis resistance of the PBT resin, mechanical properties and heat resistance are deteriorated.

Therefore, it is necessary to develop a material having excellent mechanical properties, heat resistance, and hydrolysis resistance.

RELATED ART DOCUMENTS

Patent Documents

KR 10-1201832 B1

BRIEF DESCRIPTION

Technical Problem

Therefore, the present invention has been made in view of the above problems, and it is one object of the present invention to provide a thermoplastic resin composition having excellent mechanical properties, heat resistance, and hydrolysis resistance.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 30 to 50% by weight of a polybutylene terephthalate resin (A); 8 to 20% by weight of a polyethylene terephthalate resin (B); 3 to 15% by weight of an acrylate-aromatic vinyl compound-vinyl cyanide compound graft copolymer (C); 3 to 15% by weight of an aromatic vinyl compound-vinyl cyanide compound copolymer (D); 25 to 40% by weight of glass fiber (E); 0.15 to 1% by weight of a carbodiimide-based compound (F); 0.5 to 1.5% by weight of an epoxy compound (G); and 0.25 to 1.2% by weight of a hindered amine-based light stabilizer (H).

In addition, the present invention can provide a thermoplastic resin composition including 30 to 50% by weight of a polybutylene terephthalate resin (A); 8 to 20% by weight of a polyethylene terephthalate resin (B); 3 to 15% by weight of an acrylate-aromatic vinyl compound-vinyl cyanide compound graft copolymer (C); 3 to 15% by weight of an aromatic vinyl compound-vinyl cyanide compound copolymer (D); 25 to 40% by weight of glass fiber (E); 0.15 to 1% by weight of a carbodiimide-based compound (F); 0.5 to 1.5% by weight of an epoxy compound (G); and 0.25 to 1.2% by weight of a hindered amine-based light stabilizer (H), wherein when flexural strength is measured at a span of 64 mm and a speed of 2 mm/min according to ISO 178 before and after an Air-HAST test (120° C., RH: 85%, air partial pressure: 0.06 MPa, 96 hours), and flexural strength retention rate is calculated by Equation 1 below, the thermoplastic resin composition has a flexural strength retention rate of 60% or more:

$$\text{Flexural strength retention rate (\%)} = [FS'/FS] \times 100, \quad \text{[Equation 1]}$$

wherein FS is flexural strength before the Air-HAST test, and FS' is flexural strength after the Air-HAST test.

In addition, the present invention can provide a thermoplastic resin composition including 30 to 50% by weight of a polybutylene terephthalate resin (A); 8 to 20% by weight of a polyethylene terephthalate resin (B); 3 to 15% by weight of an acrylate-aromatic vinyl compound-vinyl cyanide compound graft copolymer (C); 3 to 15% by weight of an aromatic vinyl compound-vinyl cyanide compound copolymer (D); 25 to 40% by weight of glass fiber (E); 0.15 to 1% by weight of a carbodiimide-based compound (F); 0.5 to 1.5% by weight of an epoxy compound (G); and 0.25 to 1.2% by weight of a hindered amine-based light stabilizer (H), wherein the thermoplastic resin composition has a melt flow rate of 6 g/10 min or more as measured at 260° C. under a load of 2.16 kg according to ISO 1133.

The polybutylene terephthalate resin (A) can have an intrinsic viscosity of preferably 0.6 to 0.9 dl/g.

The polyethylene terephthalate resin (B) can be preferably a homopolymer.

The acrylate-aromatic vinyl compound-vinyl cyanide compound graft copolymer (C) can include preferably 23 to 35% by weight of a vinyl cyanide compound based on a total weight thereof.

The aromatic vinyl compound-vinyl cyanide compound copolymer (D) can include preferably 26 to 40% by weight of a vinyl cyanide compound based on a total weight thereof.

The glass fiber (E) can include preferably 50 to 70% by weight of silica ($SiO_2$) based on a total weight thereof.

The carbodiimide-based compound (F) can preferably include a compound of Chemical Formula 1 below, a compound of Chemical Formula 2 below, or a mixture thereof:

[Chemical Formula 1]

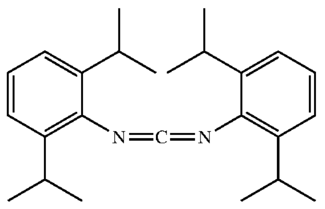

[Chemical Formula 2]

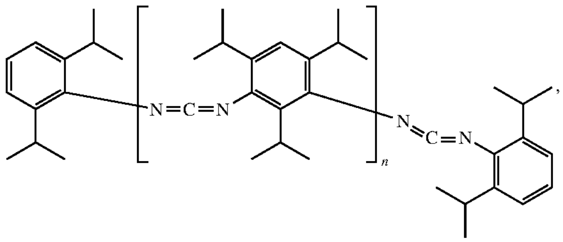

wherein, in Chemical Formula 2, n is an integer from 1 to 15.

The epoxy compound (G) can include preferably one or more selected from the group consisting of an aromatic epoxy resin, an alicyclic epoxy resin, and an aliphatic epoxy resin.

The hindered amine-based light stabilizer (H) can include preferably one or more selected from the group consisting of poly[[6-[(1, 1, 3, 3-tetramethylbutyl) amino]-1, 3, 5-triazine-2, 4-diyl][(2, 2, 6, 6-tetramethyl-4-piperidinyl) imino]-1, 6-hexanediyl[(2, 2, 6, 6-tetramethyl-4-piperidinyl) imino]], bis (2, 2, 6, 6-tetramethyl-4-piperidyl) sebacate, decanedioic acid bis (2,2, 6, 6-tetramethyl-1-(octyloxy)-4-piperidinyl) ester, 1,1-dimethylethylhydroperoxide, bis (1, 2, 2, 6, 6-pentamethyl-4-piperidyl[[3, 5-bis (1, 1-dimethylethyl)-4-hydroxyphenyl]methyl]butylmalonate, bis (1, 2, 2, 6, 6-pentamethyl-4-piperidyl)-sebacate, and methyl-1, 2, 2, 6, 6-pentamethyl-4-piperidylsebacate.

The thermoplastic resin composition can have a tensile strength of preferably 145 MPa or more as measured at a speed of 50 mm/min according to ISO 527.

In accordance with another aspect of the present invention, provided is a method of preparing a thermoplastic resin composition, the method including melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H).

In addition, the present invention can provide a method of preparing a thermoplastic resin composition, the method including melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H), wherein, when flexural strength is measured at a span of 64 mm and a speed of 2 mm/min according to ISO 178 before and after the Air-HAST test (120° C., RH: 85%, air partial pressure: 0.06 MPa, 96 hours), and flexural strength retention rate is calculated by Equation 1 below, the thermoplastic resin composition has a flexural strength retention rate of 60% or more:

$$\text{Flexural strength retention rate (\%)} = [FS'/FS] \times 100, \qquad \text{[Equation 1]}$$

wherein FS is flexural strength before the Air-HAST test, and FS' is flexural strength after the Air-HAST test.

In addition, the present invention can provide a method of preparing a thermoplastic resin composition, the method including melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H), wherein the thermoplastic resin composition has a melt flow rate of 6 g/10 min or more as measured at 260° C. under a load of 2.16 kg according to ISO 1133.

In accordance with yet another aspect of the present invention, provided is a molded article including the thermoplastic resin composition.

The molded article can be preferably an automotive exterior material or an electric/electronic part.

Advantageous Effects

According to the present invention, the present invention has an effect of providing a high-quality thermoplastic resin composition having excellent mechanical properties, heat resistance, and hydrolysis resistance and thus being applicable to automotive exterior materials and materials for electric/electronic parts, a method of preparing the thermoplastic resin composition, and a molded article including the thermoplastic resin composition.

DETAILED DESCRIPTION

Hereinafter, a thermoplastic resin composition, a method of preparing the same, and a molded article including the same according to the present invention will be described in detail.

The present inventors confirmed that, when a polybutylene terephthalate resin, a polyethylene terephthalate resin, an acrylate-aromatic vinyl compound-vinyl cyanide compound graft copolymer, an aromatic vinyl compound-vinyl cyanide compound copolymer, glass fiber, a carbodiimide-based compound, an epoxy compound, and a hindered amine-based light stabilizer were adjusted in a predetermined content ratio, mechanical properties, such as impact strength and tensile strength, and heat resistance were excellent, and hydrolysis resistance was improved. Based on these results, the present inventors conducted further studies complete the present invention.

The thermoplastic resin composition according to the present invention will be described in detail as follows.

The thermoplastic resin composition of the present invention includes 30 to 50% by weight of a polybutylene terephthalate resin (A); 8 to 20% by weight of a polyethylene terephthalate resin (B); 3 to 15% by weight of an acrylate-aromatic vinyl compound-vinyl cyanide compound graft copolymer (C); 3 to 15% by weight of an aromatic vinyl compound-vinyl cyanide compound copolymer (D); 25 to 40% by weight of glass fiber (E); 0.15 to 1% by weight of a carbodiimide-based compound (F); 0.5 to 1.5% by weight of an epoxy compound (G); and 0.25 to 1.2% by weight of a hindered amine-based light stabilizer (H). In this case, mechanical properties, such as impact strength, tensile strength, flexural strength, and flexural modulus, heat resistance, and hydrolysis resistance can be excellent. Thus, the thermoplastic resin composition can be suitable for automotive exterior materials and materials for electric/electronic parts.

Hereinafter, each component of the thermoplastic resin composition of the present invention will be described in detail.

(A) Polybutylene Terephthalate Resin

For example, based on a total weight of the thermoplastic resin composition, the polybutylene terephthalate resin (A) can be included in an amount of 30 to 50% by weight, preferably 35 to 45% by weight, more preferably 37 to 42% by weight. Within this range, mechanical properties, such as impact strength, tensile strength, elongation, flexural strength, and flexural modulus, melt flow rate, and heat resistance can be excellent.

The polybutylene terephthalate resin (A) can have an intrinsic viscosity of preferably 0.6 to 0.9 dl/g, more preferably 0.7 to 0.9 dl/g, still more preferably 0.75 to 0.85 dl/g. Within this range, due to proper melt flow rate, processability, molding processability, and molding stability can be excellent.

In the present disclosure, when intrinsic viscosity is measured, unless noted otherwise, a sample to be measured is completely dissolved in methylene chloride, and then is filtered using a filter to obtain a filtrate. Then, using the obtained filtrate, intrinsic viscosity is measured at 20° C. using a Ubbelohde viscometer.

As the polybutylene terephthalate resin (A), a conventional polybutylene terephthalate resin can be used without particular limitation. For example, the polybutylene terephthalate resin (A) can be a polymer obtained by condensation polymerization of 1, 4-butanediol and dimethyl terephthalate.

A method of preparing a polybutylene terephthalate resin commonly practiced in the art to which the present invention pertains can be used to prepare the polybutylene terephthalate resin (A).

(B) Polyethylene Terephthalate Resin

For example, based on a total weight of the thermoplastic resin composition, the polyethylene terephthalate resin (B) can be included in an amount of 8 to 20% by weight, preferably 10 to 17% by weight, more preferably 11 to 15% by weight. Within this range, mechanical properties, such as impact strength, tensile strength, elongation, flexural strength, and flexural modulus, melt flow rate, and heat resistance can be excellent.

The polyethylene terephthalate resin (B) can be preferably a homopolymer. In this case, mechanical properties, particularly flexural strength and flexural modulus, can be excellent, and heat resistance can also be excellent.

In the present disclosure, the polyethylene terephthalate homopolymer refers to a polymer obtained by condensation polymerization of a diacid compound and a di-alcohol as a monomer, specifically a polymer obtained by condensation polymerization of terephthalic acid or terephthalic acid dimethyl and ethylene glycol.

The polyethylene terephthalate homopolymer (B) can have an intrinsic viscosity of preferably 0.6 to 1.2 dl/g, more preferably 0.6 to 1.1 dl/g, still more preferably 0.6 to 1 dl/g, still more preferably 0.7 to 0.9 dl/g. Within this range, due to proper melt flow rate, processability, molding processability, and molding stability can be excellent.

(C) Acrylate-Aromatic Vinyl Compound-Vinyl Cyanide Compound Graft Copolymer

For example, based on a total weight of the thermoplastic resin composition, the graft copolymer (C) can be included in an amount of 3 to 15% by weight, preferably 5 to 13% by weight, more preferably 7 to 10% by weight. Within this range, melt flow rate, heat resistance, and mechanical properties, particularly impact strength at room temperature and low temperature, can be excellent.

The acrylate-aromatic vinyl compound-vinyl cyanide compound graft copolymer (C) can be a graft copolymer including preferably 23 to 35% by weight, more preferably 25 to 33% by weight, still more preferably 25 to 31% by weight of a vinyl cyanide compound. Within this range, mechanical properties, particularly impact strength at room temperature and low temperature, and heat resistance can be excellent.

For example, the graft copolymer (C) can be a graft copolymer including 23 to 35% by weight of a vinyl cyanide compound, 30 to 45% by weight of acrylate-based rubber, and 25 to 40% by weight of an aromatic vinyl compound, preferably a graft copolymer including 25 to 33% by weight of a vinyl cyanide compound, 35 to 43% by weight of acrylate-based rubber, and 30 to 37% by weight of an aromatic vinyl compound, more preferably a graft copolymer including 25 to 31% by weight of a vinyl cyanide compound, 38 to 43% by weight of acrylate-based rubber, and 30 to 35% by weight of an aromatic vinyl compound. Within this range, melt flow rate, heat resistance, and mechanical properties, particularly impact strength at room temperature and low temperature, can be excellent.

For example, the acrylate-based rubber is acrylate-containing rubber, and can have an average particle diameter of 400 to 2,500 Å, preferably 500 to 2,000 Å, more preferably 700 to 1,500 Å. Within this range, especially at room temperature and low temperature, impact strength can be excellent.

In the present disclosure, average particle diameter can be measured by dynamic light scattering, and specifically, can be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 usec.

For example, the graft copolymer (C) can have a grafting degree of 20 to 60%, preferably 25 to 55%, more preferably 30 to 50%, still more preferably 30 to 40%. Within this range, especially at room temperature and low temperature, impact strength can be excellent.

In the present disclosure, when a grafting degree is measured, graft polymer latex is coagulated, washed, and dried to obtain powdered graft polymer latex, and 30 ml of acetone is added to 2 g of the powdered graft polymer latex, followed by stirring for 24 hours. Then, ultracentrifugation is performed to separate insoluble matter that is not dissolved in acetone, followed by drying at 60 to 120° C. Then, the weight of the insoluble matter is measured. The measured value is substituted into Equation 2 below to calculate a grafting degree.

$$\text{Grafting degree (\%)} = [\text{Weight (g) of grafted monomers/Rubber weight (g)}] \times 100 \qquad \text{[Equation 2]}$$

In Equation 2, the weight of grafted monomers (g) is obtained by subtracting rubber weight (g) from the weight of insoluble substances (gel) obtained by dissolving a graft copolymer in acetone and performing centrifugation, and the rubber weight (g) is the weight (g) of rubber components theoretically added to graft copolymer powder.

In the present disclosure, a polymer including a certain compound means a polymer prepared by polymerizing the compound, and a unit in the polymer is derived from the compound.

For example, the acrylate of the present invention can include one or more selected from the group consisting of alkyl acrylates containing an alkyl group having 2 to 8 carbon atoms, preferably an alkyl acrylate containing an alkyl group having 4 to 8 carbon atoms, still more preferably butyl acrylate, ethylhexyl acrylate, or a mixture thereof.

For example, the vinyl cyanide compound of the present invention can include one or more selected from the group consisting of methacrylonitrile, acrylonitrile, ethylacrylonitrile, and isopropylacrylonitrile, preferably acrylonitrile.

For example, the aromatic vinyl compound of the present invention can include one or more selected from the group consisting of styrene, α-methyl styrene, o-methyl styrene, p-methyl styrene, m-methyl styrene, ethyl styrene, isobutyl styrene, t-butyl styrene, 0-bromostyrene, p-bromostyrene, m-bromostyrene, 0-chlorostyrene, p-chlorostyrene, m-chlorostyrene, vinyltoluene, vinylxylene, fluorostyrene, and vinylnaphthalene, preferably styrene.

Preparation methods commonly used in the art to which the present invention pertains can be used to prepare the graft copolymer (C) without particular limitation. For example, the graft copolymer (C) can be prepared by suspension polymerization, emulsion polymerization, solution polymerization, or bulk polymerization, preferably emulsion polymerization.

(D) Aromatic Vinyl Compound-Vinyl Cyanide Compound Copolymer

For example, based on a total weight of the thermoplastic resin composition, the aromatic vinyl compound-vinyl cyanide compound copolymer (D) can be included in an amount of 3 to 15% by weight, preferably 5 to 13% by weight, more preferably 7 to 10% by weight. Within this range, melt flow rate and mechanical properties, particularly flexural modulus, can be excellent, and heat deflection temperature can be excellent at both high and low loads.

The aromatic vinyl compound-vinyl cyanide compound copolymer (D) can be a copolymer including preferably 26 to 40% by weight, more preferably 26 to 35% by weight, still more preferably 27 to 32% by weight of a vinyl cyanide compound. Within this range, melt flow rate and mechanical properties, particularly flexural modulus, can be excellent, and heat resistance can be excellent at both high and low loads.

In the present disclosure, in heat resistance evaluation, the high load is 1.80 MPa, and the low load is 0.45 MPa.

For example, the aromatic vinyl compound-vinyl cyanide compound copolymer (D) can have a weight average molecular weight of 100,000 to 180,000 g/mol, preferably 120,000 to 150,000 g/mol. Within this range, processability and injection stability can be excellent while mechanical properties are maintained at a certain level.

In the present disclosure, weight average molecular weight can be measured using tetrahydrofuran (THE) as an eluate through gel permeation chromatography (GPC, Waters Breeze). In this case, weight average molecular weight is obtained as a relative value to a polystyrene (PS) standard sample. Specifically, the weight average molecular weight is a weight average molecular weight (Mw) converted based on polystyrene by gel permeation chromatography (GPC, PL GPC220, Agilent Technologies). More specifically, weight average molecular weight is measured through gel permeation chromatography (GPC, Waters 2410 RI detector, 515 HPLC pump, 717 auto sampler). 0.02 g of each polymer is dissolved in 20 ml of tetrahydrofuran (THF), filtered using a 0.45 μm filter, and placed in a GPC vial (4 ml) to prepare each sample. From 1 hour before start of measurement, the solvent (THE) is injected at a rate of 1.0 mL/min, and measurement is performed under conditions of a measurement time of 25 minutes, an injection volume of 150 μL, a flow rate of 1.0 ml/min, an isocratic pump mode, and an RI detector (condition: 40). At this time, calibration can be performed using a polystyrene standard (PS), and data processing can be performed using ChemStation.

For example, the aromatic vinyl compound-vinyl cyanide compound copolymer (D) can be a styrene-acrylonitrile copolymer (SAN resin), an a-methylstyrene-acrylonitrile copolymer (heat-resistant SAN resin), or a mixture thereof, more preferably a styrene-acrylonitrile copolymer (SAN resin). In this case, heat resistance can be excellent at both high and low loads while mechanical properties and melt flow rate are maintained at a certain level.

Preparation methods commonly used in the art to which the present invention pertains can be used to prepare the aromatic vinyl compound-vinyl cyanide compound copolymer (D) without particular limitation. For example, the aromatic vinyl compound-vinyl cyanide compound copolymer (D) can be prepared by suspension polymerization, emulsion polymerization, solution polymerization, or bulk polymerization, preferably bulk polymerization. In this case, heat resistance and melt flow rate can be excellent.

(E) Glass Fiber

For example, based on a total weight of the thermoplastic resin composition, the glass fiber (E) can be included in an amount of 25 to 40% by weight, preferably 25 to 35% by weight, more preferably 27 to 32% by weight. Within this range, melt flow rate, mechanical properties, and heat resistance can be excellent.

Based on a total weight thereof, the glass fiber (E) can include preferably 50 to 70% by weight, more preferably 51 to 65% by weight, still more preferably 51 to 58% by weight of silica ($SiO_2$). Within this range, tensile strength, flexural strength, and flexural modulus can be excellent while melt flow rate and impact strength are maintained, and heat resistance can be excellent, especially at a low load.

Specifically, the glass fiber (E) can be preferably glass fiber including 50 to 70% by weight of silica ($SiO_2$), 16 to 30% by weight of aluminum oxide ($Al_2O_3$), 5 to 25% by weight of calcium oxide (CaO), and 5 to 20% by weight of other components, including MgO, more preferably glass fiber including 51 to 65% by weight of silica ($SiO_2$), 17 to 28% by weight of aluminum oxide ($Al_2O_3$), 10 to 24% by weight of calcium oxide (CaO), and 8 to 18% by weight of other components, including MgO, still more preferably glass fiber including 51 to 58% by weight of silica ($SiO_2$), 17 to 24% by weight of aluminum oxide ($Al_2O_3$), 15 to 22% by weight of calcium oxide (Cao), and 10 to 15% by weight of other components, including MgO. Within this range, tensile strength, flexural strength, and flexural modulus can be excellent while melt flow rate and impact strength are maintained, and heat resistance can be excellent, especially at a low load.

The other components, including MgO, can include one or more selected from the group consisting of MgO, $Na_2O$, $K_2O$, $Li_2O$, $Fe_2O_3$, B203, and SrO.

For example, the glass fiber (E) can have an average diameter of 3 to 25 μm, preferably 5 to 20 μm, more preferably 8 to 15 μm. Within this range, due to improvement in compatibility with resins, mechanical strength can be increased, and a final product can have excellent appearance.

For example, the glass fiber (E) can have an average length of 1 to 15 mm, preferably 2 to 7 mm, more preferably 2.5 to 5 mm. Within this range, due to improvement in compatibility with resins, mechanical strength can be increased, and a final product can have excellent appearance.

In the present disclosure, when the average length and average diameter of glass fiber are measured, the length and diameter of 30 glass fibers are measured using a scanning electron microscope (SEM), and an average value thereof is calculated.

For example, the glass fiber (E) can be chopped glass fiber. In this case, compatibility can be excellent.

In the present disclosure, chopped glass fiber commonly used in the art to which the present invention pertains can be used in the present invention without particular limitation.

For example, the glass fiber (E) can have an aspect ratio (L/D) of average length (L) to average diameter (D) of 200 to 550, preferably 220 to 450, more preferably 250 to 350, still more preferably 270 to 320. Within this range, due to improvement in compatibility with resins, excellent appearance can be implemented.

For example, the glass fiber (E) can be surface-treated with a silane-based compound, a urethane-based compound, or a mixture thereof, preferably a surface treatment agent including one or more selected from the group consisting of an amino silane-based compound, an epoxy silane-based compound, and a urethane-based compound, more preferably an epoxy silane-based compound. In this case, glass fiber can be evenly dispersed in a polybutylene terephthalate resin and a polyethylene terephthalate resin, and thus mechanical strength, heat resistance, and the surface properties of an injection-molded product can be excellent.

For example, based on 100% by weight in total of the surface-treated glass fiber (glass fiber+surface treatment agent), the surface treatment agent can be included in an amount of 0.1 to 10% by weight, preferably 0.1 to 5% by weight, more preferably 0.1 to 3% by weight, still more preferably 0.1 to 0.8% by weight, still more preferably 0.2 to 0.5% by weight. Within this range, mechanical properties, physical property balance, and the appearance of a final product can be excellent.

As the amino silane-based compound, an amino silane generally used as a sizing agent or a coating agent for glass fiber can be used without particular limitation. For example, the amino silane-based compound can include one or more selected from the group consisting of gamma-glycidoxypropyl triethoxy silane, gamma-glycidoxypropyl trimethoxy silane, gamma-glycidoxypropyl methyldiethoxy silane, gamma-glycidoxypropyl triethoxy silane, 3-mercaptopropyl trimethoxy silane, vinyltrimethoxysilane, vinyltriethoxy silane, gamma-methacryloxypropyl trimethoxy silane, gamma-methacryloxypropyl triethoxy silane, gamma-aminopropyl trimethoxy silane, gamma-aminopropyl triethoxy silane, 3-isocyanate propyltriethoxy silane, gamma-acetoacetatepropyl trimethoxysilane, acetoacetatepropyl triethoxy silane, gamma-cyanoacetyl trimethoxy silane, gamma-cyanoacetyl triethoxy silane, and acetoxyaceto trimethoxy silane. In this case, mechanical properties, heat resistance, and the surface properties of an extruded product can be excellent.

As the epoxy silane-based compound, an epoxy silane generally used as a coating agent for glass fiber can be used without particular limitation. For example, the epoxy silane-based compound can include one or more selected from the group consisting of 3-glycidyloxypropyltrimethoxysilane, 3-glycidyloxypropyl-triethoxysilane, 3-glycidyloxypropyl (dimethoxy)-methylsilane, and 2-(3, 4-epoxycyclohexyl)-ethyltrimethoxysilane. In this case, mechanical properties, heat resistance, and the surface properties of an extruded product can be excellent.

The content of the glass fiber (E) can be appropriately selected within the range commonly used in the art according to the definition of the present invention, and the cross-sectional shape thereof can have a cylindrical shape, an oval shape, or the like, without particular limitation.

(F) Carbodiimide-Based Compound

For example, based on a total weight of the thermoplastic resin composition, the carbodiimide-based compound (F) can be included in an amount of 0.15 to 1% by weight, preferably 0.15 to 0.7% by weight, more preferably 0.2 to 0.5% by weight. Within this range, mechanical properties, heat resistance, and hydrolysis resistance can be excellent, thereby improving flexural strength retention rate.

For example, the carbodiimide-based compound (F) can include a compound of Chemical Formula 1 below, a compound of Chemical Formula 2 below, or a mixture thereof. In this case, mechanical properties, heat resistance, and flexural strength retention rate can be excellent.

[Chemical Formula 1]

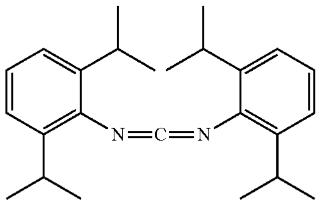

[Chemical Formula 2]

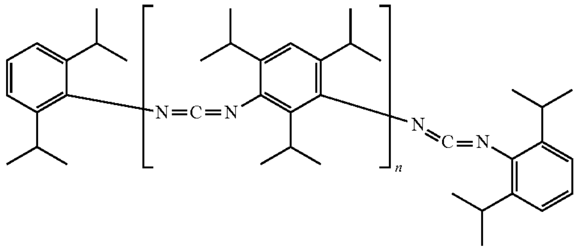

In Chemical Formula 2, n is an integer from 1 to 15.

For example, the carbodiimide-based compound (F) can have a melting point of 56 to 95° C., preferably 60 to 90° C. Within this range, mechanical properties can be excellent.

In the present disclosure, melting point can be measured using a differential scanning calorimeter 2920 (DSC 2920, TA Co.). As a specific example of measuring melting point, after a DSC is equilibrated at a temperature of 0° C., the temperature is increased to 180° C. at a rate of 20° C./min, the temperature is reduced to −60° C. at a rate of 20° C./min, and then the temperature is increased to 180° C. at a rate of 10° C./min. At this time, in the second temperature increase section, melting point is obtained from the top region of an endothermic curve.

For example, the carbodiimide-based compound (F) can be a carbodiimide-based polymer. In this case, mechanical properties can be excellent.

In the present disclosure, a carbodiimide-based polymer having a melting point of 56 to 96° C. can be used without particular limitation.

For example, the carbodiimide-based compound (F) can have a weight average molecular weight of 500 to 4,000 g/mol, preferably 1,000 to 3,000 g/mol. Within this range, mechanical properties can be further improved.

(G) Epoxy Compound

For example, based on a total weight of the thermoplastic resin composition, the epoxy compound (G) can be included in an amount of 0.5 to 1.5% by weight, preferably 0.5 to 1.2% by weight, more preferably 0.6 to 0.9% by weight. Within this range, mechanical properties, heat resistance, and hydrolysis resistance can be excellent, thereby improving flexural strength retention rate.

The epoxy compound (G) binds to a carboxyl group at the terminal of the polybutylene terephthalate resin (A) in the presence of the hindered amine-based light stabilizer (H) to be described later to improve hydrolysis resistance.

The epoxy compound (G) contains at least two epoxy groups, and the types of the epoxy compound are not particularly limited. For example, one or more selected from the group consisting of an aromatic epoxy resin, an alicyclic epoxy resin, and an aliphatic epoxy resin can be used.

The aromatic epoxy resin contains an aromatic group. For example, the aromatic epoxy resin can include one or more selected from the group consisting of a bisphenol-type epoxy resin, a novolac-type epoxy resin, a cresol epoxy resin, and a resorcinol glycidyl ether resin, preferably a novolac-type epoxy resin.

For example, the bisphenol-type epoxy resin can include one or more selected from the group consisting of a bisphenol A-based epoxy resin, a bisphenol F-based epoxy resin, a bisphenol S-based epoxy resin, and a brominated bisphenol-based epoxy resin.

For example, the novolac-type epoxy resin can include one or more selected from the group consisting of a phenol novolac-type epoxy resin and a cresol novolac-type epoxy resin.

The alicyclic epoxy resin is a compound in which an epoxy group is formed between two adjacent carbon atoms constituting an aliphatic ring. For example, the alicyclic epoxy resin can include one or more selected from the group consisting of dicyclopentadiene dioxide, limonene dioxide, 4-vinylcyclohexene dioxide, 2,4-epoxycyclohexylmethyl, 3, 4-epoxycyclohexanecarboxylate, dicyclopentadiene dioxide, and bis (3,4-epoxycyclohexylmethyl) adipate.

For example, the aliphatic epoxy resin can include one or more selected from the group consisting of polyglycidyl ethers of aliphatic polyhydric alcohols and polyglycidyl ethers of alkylene oxide adducts of aliphatic polyhydric alcohols.

For example, the aliphatic polyhydric alcohol has preferably 2 to 20 carbon atoms, and specifically can be an aliphatic diol, an alicyclic diol, or a trivalent or higher polyol.

For example, the aliphatic diol can include one or more selected from the group consisting of ethylene glycol, 1, 2-propanediol, 1, 3-propanediol, 2-methyl-1, 3-propanediol, 2-butyl-2-ethyl-1, 3-propanediol, 1,4-butanediol, neopentyl glycol, 3-methyl-2, 4-pentanediol, 2, 4-pentanediol, 1, 5-pentanediol, 3-methyl-1,5-pentanediol, 2-methyl-2, 4-pentanediol, 2, 4-diethyl-1, 5-pentanediol, 1, 6-hexanediol, 1, 7-heptanediol, 3,5-heptanediol, 1, 8-octanediol, 2-methyl-1, 8-octanediol, 1, 9-nonanediol, and 1, 10-decanediol.

For example, the alicyclic diol can include one or more selected from the group consisting of cyclohexanedimethanol, cyclohexanediol, hydrogenated bisphenol A, and hydrogenated bisphenol F.

For example, the trivalent or higher polyol can include one or more selected from the group consisting of trimethylolethane, trimethylolpropane, hexitols, pentitols, glycerin, polyglycerin, pentaerythritol, dipentaerythritol, and tetramethylolpropane.

For example, the alkylene oxide can include one or more selected from the group consisting of ethylene oxide, propylene oxide, and butylene oxide.

(H) Hindered Amine-Based Light Stabilizer

For example, based on a total weight of the thermoplastic resin composition, the hindered amine-based light stabilizer (H) can be included in an amount of 0.25 to 1.2% by weight, preferably 0.25 to 1% by weight, more preferably 0.3 to 0.8% by weight. Within this range, mechanical properties can be excellent, and heat resistance and flexural strength retention rate can be further improved.

For example, the hindered amine-based light stabilizer (H) can include one or more selected from the group consisting of poly[[6-[(1, 1, 3, 3-tetramethylbutyl) amino]-1, 3, 5-triazine-2, 4-diyl][(2, 2, 6, 6-tetramethyl-4-piperidinyl) imino]-1, 6-hexanediyl[(2, 2, 6, 6-tetramethyl-4-piperidinyl) imino]], bis (2, 2, 6, 6-tetramethyl-4-piperidyl) sebacate, decanedioic acid bis (2, 2, 6, 6-tetramethyl-1-(octyloxy)-4-piperidinyl) ester, 1, 1-dimethylethylhydroperoxide, bis (1, 2, 2, 6, 6-pentamethyl-4-piperidyl[[3, 5-bis (1, 1-dimethylethyl)-4-hydroxyphenyl]methyl]butylmalonate, bis (1, 2, 2, 6, 6-pentamethyl-4-piperidyl)-sebacate, and methyl-1, 2, 2, 6, 6-pentamethyl-4-piperidylsebacate, preferably poly[[6-[(1, 1, 3, 3-tetramethylbutyl) amino]-1, 3, 5-triazine-2, 4-diyl][(2, 2, 6, 6-tetramethyl-4-piperidinyl) imino]-1, 6-hexanediyl[(2, 2, 6, 6-tetramethyl-4-piperidinyl) imino]]. In this case, heat resistance can be further improved, and discoloration can be prevented while mechanical strength is maintained.

In the present disclosure, the total weight of the thermoplastic resin composition means a total weight of the polybutylene terephthalate resin (A), the polyethylene terephthalate resin (B), the acrylate-aromatic vinyl compound-vinyl cyanide compound graft copolymer (C), the aromatic vinyl compound-vinyl cyanide compound copolymer (D), the glass fiber (E), the carbodiimide-based compound (F), the epoxy compound (G), and the hindered amine-based light stabilizer (H).

Additives

For example, the thermoplastic resin composition can include one or more additives selected from the group consisting of an antioxidant, a lubricant, and a transesterification inhibitor. In this case, processability, light resistance, and mechanical properties can be improved.

For example, the antioxidant can be a phenol-based antioxidant, a phosphorus-based antioxidant, or a mixture thereof, preferably a phenol-based antioxidant. In this case, oxidation by heat can be prevented during an extrusion process, and mechanical properties and heat resistance can be excellent.

For example, the phenol-based antioxidant can include one or more selected from the group consisting of N, N'-hexane-1, 6-diyl-bis[3-(3,5-di-t-butyl-4-hydroxyphenyl propionamide)], pentaerythritol tetrakis[3-(3,5-di-t-butyl-4-hydroxyphenyl) propionate], N, N'-hexamethylene-bis (3, 5-di-t-butyl-4-hydroxy-hydrocinnamamide), triethylene glycol-bis[3-(3-t-butyl-5-methyl-4-hydroxyphenyl) propionate], 3, 5-di-t-butyl-4-hydroxybenzylphosphonate-diethylester, 1, 3, 5-trimethyl-2, 4, 6-tris (3, 5-di-t-butyl-4-hydroxybenzyl) benzene, and 1, 3, 5-tris (4-t-butyl-3-hydroxy-2, 6-dimethylbenzyl) isocyanurate. In this case, heat resistance can be greatly improved while physical property balance is maintained.

For example, the phosphorus-based antioxidant can include one or more selected from the group consisting of triphenyl phosphite, tris (nonylphenyl) phosphite, tris (2, 4-di-tert-butylphenyl) phosphite, tris (2, 6-di-tert-butylphenyl) phosphite, tridecyl phosphite, trioctyl phosphite, trioctadecyl phosphite, dodecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis (2, 6-di-tert-butyl-4-methylphenyl) pentaerythritol diphosphite, 2, 2-methylene-bis (4, 6-di-tert-butylphenyl) octylphosphite, bis (nonylphenyl) pentaerythritol diphosphite, bis (2, 4-di-tert-butylphenyl) pentaerythritol diphosphite, stearyl pentaerythritol diphosphite, tributylphosphate, triethylphosphate, and trimethylphosphate.

Based on a total weight of the thermoplastic resin composition, the antioxidant can be included in an amount of preferably 0.05 to 1% by weight, more preferably 0.1 to 0.8% by weight, still more preferably 0.2 to 0.6% by weight. Within this range, physical property balance can be excellent, and heat resistance can be improved.

When the additives are included in the thermoplastic resin composition, the total weight of the thermoplastic resin composition of the present invention means a total weight of the polybutylene terephthalate resin (A), the polyethylene terephthalate resin (B), the acrylate-aromatic vinyl compound-vinyl cyanide compound graft copolymer (C), the aromatic vinyl compound-vinyl cyanide compound copolymer (D), the glass fiber (E), the carbodiimide-based compound (F), the epoxy compound (G), the hindered amine-based light stabilizer (H), the antioxidant, the lubricant, and the transesterification inhibitor.

For example, the lubricant can include one or more selected from the group consisting of polyethylene-based wax, a sodium-neutralized ethylene-methacrylic acid copolymer, and sodium-neutralized montanic acid wax, preferably polyethylene-based wax, more preferably oxidized high-density polyethylene wax. In this case, heat resistance and melt flow rate can be improved.

The polyethylene-based wax has polarity and penetrates between polymers to allow chains to slide well and to induce intermolecular flow.

For example, based on a total weight of the thermoplastic resin composition, the lubricant can be included in an amount of 0.1 to 5% by weight, preferably 0.1 to 3% by weight, more preferably 0.2 to 1% by weight, still more preferably 0.2 to 0.5% by weight. Within this range, mechanical properties can be excellent, and heat resistance and melt flow rate can be improved.

For example, the transesterification inhibitor can be a metal phosphate-based compound, and can include preferably one or more selected from the group consisting of sodium phosphate monobasic, potassium phosphate monobasic, sodium phosphate dibasic, potassium phosphate dibasic, sodium phosphate tribasic, potassium phosphate tribasic, and calcium phosphate. In this case, physical property balance can be excellent, and mechanical properties and melt flow rate can be improved.

For example, based on a total weight of the thermoplastic resin composition, the transesterification inhibitor can be included in an amount of 0.01 to 3% by weight, preferably 0.01 to 2% by weight, more preferably 0.05 to 1% by weight, still more preferably 0.05 to 0.5% by weight. Within this range, physical property balance can be excellent, and mechanical properties and melt flow rate can be improved.

When necessary, the thermoplastic resin composition can further include one or more selected from the group consisting of a dye, a pigment, a flame retardant, and an inorganic filler. In this case, based on 100 parts by weight in total of the thermoplastic resin composition (the polybutylene terephthalate resin (A)+the polyethylene terephthalate resin (B)+the acrylate-aromatic vinyl compound-vinyl cyanide compound graft copolymer (C)+the aromatic vinyl compound-vinyl cyanide compound copolymer (D)+the glass fiber (E)+the carbodiimide-based compound (F)+the epoxy compound (G)+the hindered amine-based light stabilizer (H)), each of the additives can be included in an amount of 0.01 to 5 parts by weight, preferably 0.05 to 3 parts by weight, more preferably 0.1 to 2 parts by weight, still more preferably 0.5 to 1 part by weight. Within this range, required physical properties can be efficiently expressed without deterioration of the intrinsic properties of the thermoplastic resin composition of the present invention.

UV stabilizers, dyes, pigments, flame retardants, and inorganic fillers commonly used in the art to which the present invention pertains can be used in the present invention without particular limitation.

Thermoplastic Resin Composition

When flexural strength is measured at a span of 64 mm and a speed of 2 mm/min according to ISO 178 before and after the Air-HAST test (120° C., RH: 85%, air partial pressure: 0.06 MPa, 96 hours), and flexural strength retention rate is calculated by Equation 1 below, the thermoplastic resin composition can have a flexural strength retention rate of preferably 60% or more, more preferably 60 to 75%, still more preferably 64 to 70%. Within this range, mechanical properties, particularly flexural strength, can be maintained under high-temperature and high-humidity environments, and thus the thermoplastic resin composition can satisfy product reliability required for automotive exterior materials and materials for electronic components.

$$\text{Flexural strength retention rate (\%)}=[FS'/FS]\times 100 \quad \text{[Equation 1]}$$

In Equation 1, FS is flexural strength before the Air-HAST test, and FS' is flexural strength after the Air-HAST test.

In the present disclosure, specifically, the Air-HAST test means that a specimen is placed in a high-temperature, high-humidity bath in a chamber set to a temperature of 120° C., a relative humidity (RH) of 85%, and an air partial pressure of 0.06 MPa, and left for 96 hours.

The thermoplastic resin composition can have a flexural strength of preferably 180 MPa or more, more preferably 190 MPa or more, still more preferably 200 MPa or more, still more preferably 200 to 220 MPa, still more preferably 200 to 210 MPa as measured at a span 64 mm and a speed of 2 mm/min according to ISO 178. Within this range, mechanical properties and balance between all physical properties can be excellent.

The thermoplastic resin composition can have a flexural modulus of preferably 8,000 MPa or more, more preferably 8,000 to 10,000 MPa, still more preferably 8,000 to 9,000 MPa as measured at a span of 64 mm and a speed of 2 mm/min according to ISO 178. Within this range, mechanical properties and balance between all physical properties can be excellent.

The thermoplastic resin composition can have a melt flow rate of preferably 6 g/10 min or more, more preferably 8 g/10 min or more, still more preferably 9 g/10 min or more, still more preferably 9 to 10 g/10 min as measured at 260° C. under a load of 2.16 kg according to ISO 1133. Within this range, balance between all physical properties can be excellent, and processability and injection moldability can also be excellent.

The thermoplastic resin composition can have a tensile strength of preferably 145 MPa or more, more preferably 150 MPa or more, still more preferably 155 MPa or more, still more preferably 155 to 165 MPa as measured at a speed of 50 mm/min according to ISO 527. Within this range, mechanical strength and balance between all physical properties can be excellent.

The thermoplastic resin composition can have an Izod impact strength of 7 $KJ/m^2$ or more, more preferably 8 $KJ/m^2$ or more, still more preferably 9 $KJ/m^2$ or more, still more preferably 9 to 11 $kJ/m^2$, still more preferably 9 to 10 $KJ/m^2$ as measured at room temperature using a notched specimen having a thickness of 4 mm according to ISO 180/1A. Within this range, mechanical strength and balance between all physical properties can be excellent.

In the present disclosure, room temperature can be within the range of 20±5° C.

The thermoplastic resin composition can have an Izod impact strength of preferably 6 $KJ/m^2$ or more, more preferably 7 $KJ/m^2$ or more, still more preferably 8 $KJ/m^2$ or more, still more preferably 8 to 10 $KJ/m^2$, still more preferably 8 to 9 $kJ/m^2$ as measured at a low temperature) (−30° C. using a notched specimen having a thickness of 4 mm according to ISO 180/1A. Within this range, mechanical strength and balance between all physical properties can be excellent.

The thermoplastic resin composition can have an elongation of preferably 1% or more, more preferably 2% or more, still more preferably 2.5% or more, still more preferably 2.5 to 3.5% as measured at a speed of 50 mm/min according to ISO 527. Within this range, mechanical strength and balance between all physical properties can be excellent.

The thermoplastic resin composition can have a heat deflection temperature of preferably 180° C. or higher, more preferably 180 to 210° C., still more preferably 180 to 205° C., still more preferably 185 to 200° C. as measured under a high load of 1.82 MPa according to ISO 75. Within this range, balance between all physical properties can be excellent, and in particular, heat resistance can be excellent under a high load.

The thermoplastic resin composition can have a heat deflection temperature of preferably 205° C. or higher, more preferably 210° C. or higher, still more preferably 210 to 230° C., still more preferably 215 to 225° C., still more preferably 217 to 223° C. as measured under a low load of 0.45 MPa according to ISO 75. Within this range, balance between all physical properties can be excellent, and in particular, heat resistance can be excellent under a low load.

The thermoplastic resin composition can have a density of preferably 1.48 $g/cm^3$ or less, more preferably 1.44 to 1.48 $g/cm^3$, still more preferably 1.45 to 1.47 $g/cm^3$ as measured according to ISO 1183-1. Within this range, physical property balance can be excellent, and weight reduction can be achieved.

Method of Preparing Thermoplastic Resin Composition

A method of preparing a thermoplastic resin composition according to the present invention includes a step of melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H). In this case, mechanical properties, such as impact strength, tensile strength, flexural strength, and flexural modulus, heat resistance, and hydrolysis resistance can be excellent, and thus the thermoplastic resin composition can be applied to automotive exterior materials and materials for electric/electronic parts.

For example, the kneading and extrusion can be performed using a single-screw extruder, a twin-screw extruder, and a Banbury mixer. In this case, the composition can be uniformly distributed, and thus compatibility can be excellent.

For example, the kneading and extrusion can be performed at a barrel temperature of 200 to 300° C., preferably 230 to 280° C., more preferably 250 to 270° C. In this case, throughput per unit time can be excellent, and thermal decomposition of resin components can be prevented.

For example, the kneading and extrusion can be performed at a screw rotation rate of 100 to 300 rpm, preferably 150 to 300 rpm, more preferably 200 to 300 rpm, still more preferably 230 to 270 rpm. In this case, throughput per unit time and process efficiency can be excellent, and excessive cutting of glass fiber can be prevented.

For example, the thermoplastic resin composition obtained by extrusion can be made into pellets using a pelletizer.

Molded Article

For example, a molded article of the present invention includes the thermoplastic resin composition of the present invention. In this case, mechanical properties, such as impact strength, tensile strength, flexural strength, and flexural modulus, heat resistance, and flexural strength retention rate can be excellent, and thus the molded article can satisfy product reliability required for automotive exterior materials and materials for electric/electronic parts.

The molded article can be preferably an automotive exterior material or an electric/electronic part. In this case, mechanical properties, such as impact strength, tensile strength, flexural strength, and flexural modulus, heat resistance, and flexural strength retention rate can be excellent, and thus the molded article can satisfy product reliability required for automotive exterior materials and materials for electric/electronic parts.

A method of manufacturing the molded article preferably includes a step of preparing pellets by melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H); and a step of injecting the prepared pellets using an injection machine. In this case, physical property balance and injection processability can be excellent.

In describing the thermoplastic resin composition of the present invention, the method of preparing the same, and the molded article including the same, other conditions or equipment that are not explicitly described can be appropriately selected without particular limitation within the range commonly practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications can be made without departing from the spirit and scope of the present invention, and such changes and modifications are also within the scope of the appended claims.

Examples

Materials used in Examples and Comparative Examples below are as follows.

A-1: Polybutylene terephthalate having an intrinsic viscosity of 0.8 dl/g

A-2: Polybutylene terephthalate having an intrinsic viscosity of 1.0 dl/g

B-1: Polyethylene terephthalate homopolymer having an intrinsic viscosity of 0.8 dl/g C-1: Acrylate-styrene-acrylonitrile graft copolymer (graft copolymer obtained by graft-polymerizing 41% by weight of butyl acrylate rubber, 34% by weight of styrene, and 25% by weight of acrylonitrile, grafting degree: 35%)

D-1: Styrene-acrylonitrile copolymer (copolymer obtained by polymerizing 72% by weight of styrene and 28% by weight of acrylonitrile, weight average molecular weight: 130,000 g/mol)

D-2: Styrene-acrylonitrile copolymer (copolymer obtained by polymerizing 76% by weight of styrene and 24% by weight of acrylonitrile, weight average molecular weight: 120,000 g/mol)

E-1 (glass fiber): Glass fiber (average length: 3 mm, average particle diameter: 10 μm) including 52% by weight of $SiO_2$, 18% by weight of $Al_2O_3$, 16% by weight of Cao, and 14% by weight of other components, including MgO F (polycarbodiimide): Polycarbodiimide including an aromatic ring (aromatic polycarbodiimide)

G (epoxy compound): Novolac epoxy resin (0-cresol novolac epoxy resin)

H-1 (hindered amine-based light stabilizer): poly[[6-[(1, 1, 3, 3-tetramethylbutyl) amino]-1, 3, 5-triazine-2, 4-diyl][(2, 2, 6, 6-tetramethyl-4-piperidinyl) imino]-1, 6-hexanediyl[(2, 2, 6, 6-tetramethyl-4-piperidinyl) imino]]

H-2 (benzotriazole-based light stabilizer): 2-(2H-Benzotriazol-2yl)-4, 6-bis (1-methyl-1-phenylethyl) phenol K (phenol-based antioxidant): Pentaerythritol tetrakis (3-(3,5-di-tert-butyl-4-hydroxyphenyl) propionate)

L (polyethylene wax): LDPE Wax

M (transesterification inhibitor): Sodium phosphate monobasic ($NaH_2PO_4$)

Examples 1 to 9 and Comparative Examples 1 to 9

According to the contents and components shown in Tables 1 and 2, the components were fed into an extruder (42Ψ) and melt-kneaded and extruded at 260° C. and 250 rpm to prepare pellets. Then, the pellets were injected to prepare a specimen for measuring physical properties.

Test Examples

The properties of the specimens prepared in Examples 1 to 9 and Comparative Examples 1 to 9 were measured according to the following methods, and the results are shown in Tables 1 and 2 below.

Measurement Methods

Melt flow rate: Melt flow rate was measured at 260° C. under a load of 2.16 kg for 10 minutes according to ISO 1133. Here, the unit of melt flow rate is g/10 min.

Izod impact strength (KJ/$m^2$): Using a notched specimen having a thickness of 4 mm, Izod impact strength was measured at 23° C. and −30° C. according to ISO 180/1A, respectively.

Tensile strength (MPa) and elongation (%): Tensile strength and elongation were measured at a speed of 50 mm/min according to ISO 527.

Flexural strength (MPa) and Flexural modulus (MPa): Using a specimen having a thickness of 4 mm, flexural strength and flexural modulus were measured at a span of 64 mm and a test speed of 2 mm/min according to ISO 178.

Heat deflection temperature (HDT, ° C.): Heat deflection temperature was measured under a pressure of 1.80 MPa and 0.45 MPa according to ISO 75, respectively.

Flexural strength retention rate (%): The flexural strength of a specimen before and after the Air-HAST test was measured at a span of 64 mm and a speed of 2 mm/min according to ISO 178, and Flexural strength retention rate thereof was calculated by Equation 1 below.

The Air-HAST test was performed by placing a specimen in a high-temperature, high-humidity bath set to a temperature of 120° C., a relative humidity (RH) of 85%, and an air partial pressure of 0.06 MPa and leaving the specimen for 96 hours.

$$\text{Flexural strength retention rate (\%)} = [FS'/FS] \times 100 \quad \text{[Equation 1]}$$

In Equation 1, FS is flexural strength before the Air-HAST test, and FS' is flexural strength after the Air-HAST test.

Density (g/cm$^3$): Density was measured according to ISO 1183-1.

TABLE 1

| Classification (wt %) | Examples 1 | 2 | 3 | 4 | 5 | 6 | 7 | 8 | 9 |
|---|---|---|---|---|---|---|---|---|---|
| A-1 | 39.1 | 39.1 | | 38.8 | 38.7 | 38.9 | 42.1 | 42.1 | 42.1 |
| A-2 | | | 39.10 | | | | | | |
| B-1 | 13 | 13 | 13 | 13 | 13 | 13 | 10 | 13 | 13 |
| C-1 | 8 | 8 | 8 | 8 | 8 | 8 | 8 | 5 | 8 |
| D-1 | 8 | | 8 | 8 | 8 | 8 | 8 | 8 | 5 |
| D-2 | | 8 | | | | | | | |
| E-1 | 30 | 30 | 30 | 30 | 30 | 30 | 30 | 30 | 30 |
| F (carbodiimide) | 0.2 | 0.2 | 0.2 | 0.5 | 0.2 | 0.2 | 0.2 | 0.2 | 0.2 |
| G (epoxy) | 0.6 | 0.6 | 0.6 | 0.6 | 1.0 | 0.6 | 0.6 | 0.6 | 0.6 |
| H-1 (HALS) | 0.30 | 0.30 | 0.30 | 0.30 | 0.30 | 0.50 | 0.30 | 0.30 | 0.30 |
| K | 0.4 | 0.4 | 0.4 | 0.4 | 0.4 | 0.4 | 0.4 | 0.4 | 0.4 |
| L | 0.3 | 0.3 | 0.3 | 0.3 | 0.3 | 0.3 | 0.3 | 0.3 | 0.3 |
| M | 0.1 | 0.1 | 0.1 | 0.1 | 0.1 | 0.1 | 0.1 | 0.1 | 0.1 |
| Physical properties | | | | | | | | | |
| Melt flow rate (g/10 min) | 9.4 | 9.2 | 6.4 | 9.0 | 7.2 | 9.3 | 8.8 | 9.1 | 9.5 |
| Izod impact strength (23° C., KJ/m$^2$) | 9.3 | 9.5 | 10.1 | 9.2 | 9.3 | 9.6 | 9.7 | 8.9 | 9.6 |
| Izod impact strength (−30° C., KJ/m$^2$) | 8.4 | 8.5 | 9.2 | 8.3 | 8.6 | 8.5 | 8.6 | 8.0 | 8.4 |
| Tensile strength (MPa) | 156 | 158 | 153 | 157 | 157 | 156 | 155 | 157 | 158 |
| Elongation (%) | 2.9 | 2.7 | 2.9 | 2.8 | 2.9 | 2.8 | 2.7 | 2.8 | 2.9 |
| Flexural strength (MPa) | 206 | 208 | 204 | 207 | 209 | 208 | 206 | 206 | 207 |
| Flexural modulus (MPa) | 8230 | 8080 | 8150 | 8250 | 8010 | 8270 | 8140 | 8200 | 8180 |
| Heat deflection temperature (1.80 MPa, ° C.) | 192 | 184 | 190 | 190 | 191 | 191 | 190 | 191 | 187 |
| Heat deflection temperature (0.45 MPa, ° C.) | 218 | 216 | 217 | 218 | 217 | 217 | 218 | 216 | 218 |
| Density (g/cm$^3$) | 1.46 | 1.47 | 1.46 | 1.46 | 1.46 | 1.46 | 1.46 | 1.46 | 1.46 |
| Flexural strength retention rate (%) | 65.7 | 61.6 | 64.3 | 67.2 | 68.3 | 65.9 | 66.2 | 65.8 | 64.9 |

TABLE 2

| Classification | Comparative Examples | | | | | | | | |
|---|---|---|---|---|---|---|---|---|---|
| (wt %) | 1 | 2 | 3 | 4 | 5 | 6 | 7 | 8 | 9 |
| A-1 | 39.55 | 39.30 | 40.20 | 39.1 | 37.8 | 39.3 | 37.7 | 37.4 | 39.3 |
| A-2 | | | | | | | | | |
| B-1 | 13 | 13 | 13 | 13 | 13 | 13 | 13 | 13 | 13 |
| C-1 | 8 | 8 | 8 | 8 | 8 | 8 | 8 | 8 | 8 |
| D-1 | 8 | 8 | 8 | 8 | 8 | 8 | 8 | 8 | 8 |
| D-2 | | | | | | | | | |
| E-1 | 30 | 30 | 30 | 30 | 30 | 30 | 30 | 30 | 30 |
| F (carbodiimide) | 0.1 | 0.2 | 0 | 0.2 | 1.5 | 0 | 0.2 | 0.2 | 0.2 |
| G (epoxy) | 0.4 | 0.4 | 0 | 0.6 | 0.6 | 0.6 | 2 | 0.6 | 0.6 |
| H-1 (HALS) | 0.15 | 0.30 | 0 | 0 | 0.30 | 0.30 | 0.30 | 2 | 0.1 |
| H-2 | | | | 0.30 | | | | | |
| K | 0.4 | 0.4 | 0.4 | 0.4 | 0.4 | 0.4 | 0.4 | 0.4 | 0.4 |
| L | 0.3 | 0.3 | 0.3 | 0.3 | 0.3 | 0.3 | 0.3 | 0.3 | 0.3 |
| M | 0.1 | 0.1 | 0.1 | 0.1 | 0.1 | 0.1 | 0.1 | 0.1 | 0.1 |
| Physical properties | | | | | | | | | |
| Melt flow rate (g/10 min) | 10.8 | 10.6 | 14.2 | 9.2 | 6.8 | 11.2 | 4.1 | 7.2 | 9.2 |
| Izod impact strength (23° C., $KJ/m^2$) | 8.9 | 9.2 | 8.1 | 9.4 | 8.5 | 9.3 | 9.4 | 8.5 | 9.3 |
| Izod impact strength (−30° C., $KJ/m^2$) | 8 | 8.2 | 7.2 | 8.4 | 7.2 | 8.1 | 8.4 | 7.3 | 8.2 |
| Tensile strength (MPa) | 154 | 154 | 139 | 155 | 153 | 155 | 156 | 152 | 155 |
| Elongation (%) | 2.8 | 2.9 | 2.4 | 2.9 | 2.9 | 2.9 | 2.9 | 2.9 | 2.9 |
| Flexural strength (MPa) | 202 | 207 | 200 | 205 | 201 | 205 | 208 | 200 | 205 |
| Flexural modulus (MPa) | 8200 | 8020 | 8190 | 8250 | 7920 | 8250 | 8670 | 7900 | 8250 |
| Heat deflection temperature (1.80 MPa, ° C.) | 187 | 193 | 196 | 191 | 188 | 192 | 191 | 187 | 191 |
| Heat deflection temperature (0.45 MPa, ° C.) | 217 | 218 | 218 | 218 | 216 | 217 | 218 | 214 | 218 |
| Density ($g/cm^3$) | 1.47 | 1.47 | 1.46 | 1.46 | 1.47 | 1.46 | 1.47 | 1.46 | 1.46 |
| Flexural strength retention rate (%) | 47.7 | 50.8 | 39.6 | 58.6 | 66.1 | 44.1 | 66.7 | 64.6 | 53.1 |

As shown in Tables 1 and 2, in the case of Examples 1 to 9 according to the present invention, compared to Comparative Examples 1 to 9 outside the range of the present invention, melt flow rate, mechanical properties, heat resistance, density, and flexural strength retention rate are excellent. As a notable result, in the case of Examples 1 and 2 and Examples 4 to 9 including the polybutylene terephthalate (A) having an intrinsic viscosity of 0.6 to 0.9 dl/g, due to excellent melt flow rate, injection moldability and processability are further improved. In addition, Example 1 including the styrene-acrylonitrile copolymer (D-1) has a higher flexural strength retention rate than Example 2 including the styrene-acrylonitrile copolymer (D-2).

In addition, in the case of Comparative Example 1 including the carbodiimide-based compound (F), the epoxy compound (G), and the hindered amine-based light stabilizer (H) in an amount less than the range of the present invention and Comparative Example 2 including the epoxy compound (G) in an amount less than the range of the present invention, flexural strength retention rate is significantly reduced.

In addition, in the case of Comparative Example 3 not including the carbodiimide-based compound (F), the epoxy compound (G), and the hindered amine-based light stabilizer (H), tensile strength and flexural strength retention rate are reduced. In the case of Comparative Example 4 including a light stabilizer other than the hindered amine-based light stabilizer (H-1), flexural strength retention rate is low.

In addition, in the case of Comparative Example 5 including the carbodiimide-based compound (F) in an amount exceeding the range of the present invention, flexural modulus is low. In the case of Comparative Example 6 not including the carbodiimide-based compound (F), flexural strength retention rate is significantly reduced.

In addition, Comparative Example 7 including the epoxy compound (G) in an amount exceeding the range of the present invention has a low melt flow rate. Comparative Example 8 including the hindered amine-based light stabilizer (H-1) in an amount exceeding the range of the present invention has a low flexural modulus. Comparative Example 9 including the hindered amine-based light stabilizer (H-1) in an amount less than the range of the present invention has a low flexural strength retention rate.

In conclusion, the present invention has an effect of providing a thermoplastic resin composition having excellent mechanical properties and heat resistance and an excellent flexural strength retention rate after the Air-HAST test by including the polybutylene terephthalate resin, the polyethylene terephthalate, the acrylate-aromatic vinyl compound-vinyl cyanide compound graft copolymer, the aromatic vinyl compound-vinyl cyanide compound copolymer, the glass fiber, the carbodiimide-based compound, the epoxy compound, and the hindered amine-based light stabilizer according to the present invention in a predetermined content ratio, a method of preparing the thermoplastic resin composition, and a molded article including the thermoplastic resin composition. With these advantages, the thermoplastic resin composition can satisfy product reliability required for automotive exterior materials and materials for electric/electronic parts.

The invention claimed is:

1. A thermoplastic resin composition, comprising:

30 to 50% by weight of a polybutylene terephthalate resin (A);

8 to 20% by weight of a polyethylene terephthalate resin (B);

3 to 15% by weight of an acrylate-aromatic vinyl compound-vinyl cyanide compound graft copolymer (C);

3 to 15% by weight of an aromatic vinyl compound-vinyl cyanide compound copolymer (D);

25 to 40% by weight of glass fiber (E);

0.15 to 1% by weight of a carbodiimide-based compound (F);

0.5 to 1.5% by weight of an epoxy compound (G); and 0.25 to 1.2% by weight of a hindered amine-based light stabilizer (H), wherein the epoxy compound (G) is O-cresol novolac epoxy resin, wherein the hindered amine-based light stabilizer (H) is poly[[6-[(1,1,3,3-tetramethylbutyl)amino]-1,3,5-triazine-2.4-diyl][(2,2,6,6-tetramethyl-4-piperidinyl) imino]-1,6-hexanediyl[(2,2,6,6-tetramethyl-4-piperidinyl)imino]], and wherein, when flexural strength is measured at a span of 64 mm and a speed of 2 mm/min according to ISO 178 before and after an Air-HAST test (120° C., RH: 85%, air partial pressure: 0.06 MPa, 96 hours), and flexural strength retention rate is calculated by Equation 1 below, the thermoplastic resin composition has a flexural strength retention rate of 60% or more:

$$\text{Flexural strength retention rate (\%)}=[FS'/FS]\times 100, \quad \text{[Equation 1]}$$

wherein FS is flexural strength before the Air-HAST test, and FS' is flexural strength after the Air-HAST test.

2. The thermoplastic resin composition according to claim 1, wherein the polybutylene terephthalate resin (A) has an intrinsic viscosity of 0.6 to 0.9 dl/g.

3. The thermoplastic resin composition according to claim 1, wherein the polyethylene terephthalate resin (B) is a homopolymer.

4. The thermoplastic resin composition according to claim 1, wherein the acrylate-aromatic vinyl compound-vinyl cyanide compound graft copolymer (C) comprises 23 to 35% by weight of a vinyl cyanide compound based on a total weight thereof.

5. The thermoplastic resin composition according to claim 1, wherein the aromatic vinyl compound-vinyl cyanide compound copolymer (D) comprises 26 to 40% by weight of a vinyl cyanide compound based on a total weight thereof.

6. The thermoplastic resin composition according to claim 1, wherein the glass fiber (E) comprises 50 to 70% by weight of silica ($SiO_2$) based on a total weight thereof.

7. The thermoplastic resin composition according to claim 1, wherein the carbodiimide-based compound (F) comprises a compound of Chemical Formula 1 below, a compound of Chemical Formula 2 below, or a mixture thereof:

[Chemical Formula 1]

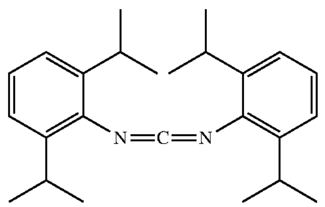

[Chemical Formula 2]

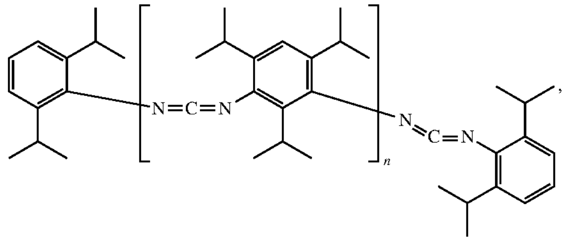

wherein, in Chemical Formula 2, n is an integer from 1 to 15.

8. The thermoplastic resin composition according to claim 1, wherein the thermoplastic resin composition has a melt flow rate of 6 g/10 min or more as measured at 260° C. under a load of 2.16 kg according to ISO 1133.

9. The thermoplastic resin composition according to claim 1, wherein the thermoplastic resin composition has a tensile strength of 145 MPa or more as measured at a speed of 50 mm/min according to ISO 527.

10. A method of preparing a thermoplastic resin composition, comprising melt-kneading and extruding, at 200 to 300° C. and 100 to 300 rpm, 30 to 50% by weight of a polybutylene terephthalate resin (A), 8 to 20% by weight of a polyethylene terephthalate resin (B), 3 to 15% by weight of an acrylate-aromatic vinyl compound-vinyl cyanide compound graft copolymer (C), 3 to 15% by weight of an aromatic vinyl compound-vinyl cyanide compound copolymer (D), 25 to 40% by weight of glass fiber (E), 0.15 to 1% by weight of a carbodiimide-based compound (F), 0.5 to 1.5% by weight of an epoxy compound (G), and 0.25 to 1.2% by weight of a hindered amine-based light stabilizer (H), wherein the epoxy compound (G) is O-cresol novolac epoxy resin, wherein the hindered amine-based light stabilizer (H) is poly[[6-[(1,1,3,3-tetramethylbutyl)amino]-1,3,5-triazine-2,4-diyl][(2,2,6,6-tetramethyl-4-piperidinyl) imino]-1,6-hexanediyl[(2,2,6,6-tetramethyl-4-piperidinyl)imino]], and wherein, when flexural strength is measured at a span of 64 mm and a speed of 2 mm/min according to ISO 178 before and after an Air-HAST test (120° C., RH: 85%, air partial pressure: 0.06 MPa, 96 hours), and flexural strength retention rate is calculated by Equation 1 below, the thermoplastic resin composition has a flexural strength retention rate of 60% or more:

$$\text{Flexural strength retention rate (\%)} = [FS'/FS]\times 100, \quad \text{[Equation 1]}$$

wherein FS is flexural strength before the Air-HAST test, and FS' is flexural strength after the Air-HAST test.

11. A molded article, comprising the thermoplastic resin composition according to claim 1.

12. The molded article according to claim 11, wherein the molded article is an automotive exterior material or an electric/electronic part.

* * * * *